J. G. SMITH.
TIRE STRUCTURE.
APPLICATION FILED MAY 31, 1919.
1,317,831.
Patented Oct. 7, 1919.
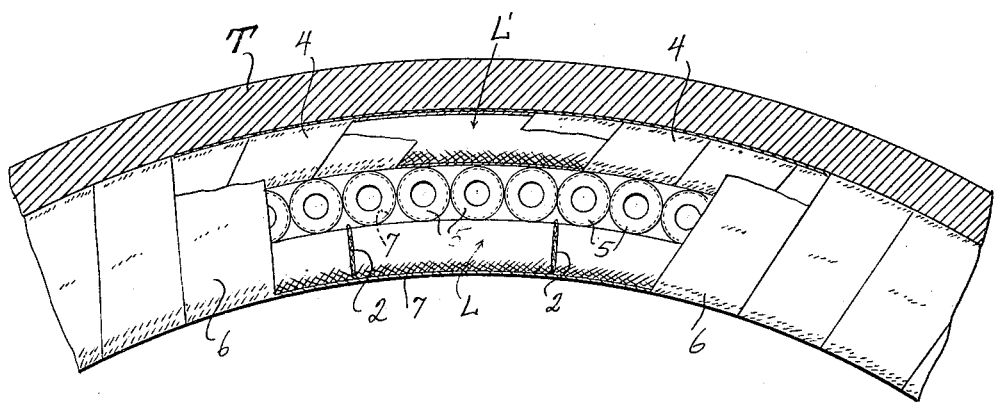
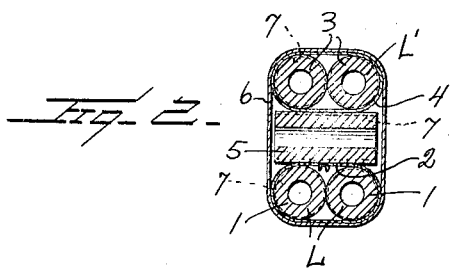
Inventor
J.G.Smith
By Watson E. Coleman
Attorney

UNITED STATES PATENT OFFICE.

JESSE G. SMITH, OF PORT ARTHUR, TEXAS, ASSIGNOR OF ONE-FOURTH TO OSCAR N. BARNETT AND ONE-FOURTH TO LOUIS C. BAUMER, OF PORT ARTHUR, TEXAS.

TIRE STRUCTURE.

1,317,831.  Specification of Letters Patent.  Patented Oct. 7, 1919.

Application filed May 31, 1919. Serial No. 300,855.

*To all whom it may concern:*

Be it known that I, JESSE G. SMITH, a citizen of the United States, residing at Port Arthur, in the county of Jefferson and State of Texas, have invented certain new and useful Improvements in Tire Structures, of which the following is a specification, reference being had to the accompanying drawings.

This invention relates to certain improvements in tire structures and has relation more particularly to a structure of this general character of a cushion type, and it is an object of the invention to provide a novel and improved structure of this general character which comprises a plurality of imposed hollow members and wherein certain of said members are circumferentially directed with respect to the structure and the remainder are arranged transversely of the tire structure.

The invention consists in the details of construction and in the combination and arrangement of the several parts of my improved tire structure whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a fragmentary view, partly in section and partly in elevation, illustrating a tire structure arranged in accordance with an embodiment of my invention, and Fig. 2 is a transverse sectional view taken through the device as illustrated in Fig. 1, the tread member being omitted.

My improved tire structure as herein disclosed comprises an inner lamination L consisting of a plurality of circumferentially disposed endless tubular members 1 formed of rubber or the like and which are suitably held substantially in contact throughout their lengths by the ties 2, herein disclosed as comprising binding cords surrounding said tubes 1.

L' denotes an outer lamination also consisting of a plurality of endless tubular members 3 arranged side by side and extending circumferentially of the structure. These tubes 3 are also preferably formed of rubber and are maintained in close contact throughout their entire length by an adhesive winding strip 4. The outer face of the lamination L' has suitably secured thereto a tread member T of any preferred character.

Interposed between the laminations L and L', and which laminations are suitably concentric one to the other when free of load, are the transversely disposed tubular members 5, also preferably of rubber, with adjacent members 5 in contact one with the other throughout their entire lengths. The members 5, in the present embodiment of my invention, are maintained in applied position through the medium of the strip 6 wrapped or wound around the assembled laminations L and L' and the interposed members 5.

It is preferred that each of the tubular members 1, 3 and 5 be provided with an outer covering 7 of textile material, so that the life thereof will be materially prolonged.

While I have hereinbefore specified the members 1, 3 and 5 as preferably formed of rubber, it is to be understood that they may also be formed of any yieldable material which will meet the requirements of practice.

It is also to be understood that, if desired, the tread member T may be omitted and the remaining structure employed as a core to be applied within a tire casing of any type now generally in use.

With the use of my improved structure, it will at once be obvious that the disadvantages of punctures and blowouts are eliminated, yet at the same time substantially the same resiliency is offered as is obtained in the use of an inflatable tire.

It will also be understood that in my improved structure, the various members 1, 3 and 5 can be readily replaced as necessitated with a minimum of expense and without the requirement of any particular skill, so that the structure is of particular advantage as regards repairs to the car owner.

From the foregoing description, it is thought to be obvious that a tire structure constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A tire structure comprising two circumferentially disposed yieldable laminations substantially concentric one to the other, each of the laminations comprising a plurality of circumferentially directed and yieldable tubular members arranged side by side and substantially in contact at all points, and transversely disposed tubular yieldable members interposed between the laminations, adjacent members of the last named tubular members being also substantially in close contact throughout their entire lengths.

2. A tire structure comprising two circumferentially disposed yieldable laminations substantially concentric one to the other, transversely disposed tubular yieldable members interposed between the laminations, and means for maintaining the laminations and tubular members in assembled relation, each of the laminations comprising a plurality of circumferentially directed and yieldable tubular members arranged side by side and substantially in contact at all points.

3. A tire structure comprising two circumferentially disposed yieldable laminations substantially concentric one to the other, transversely disposed tubular yieldable members interposed between the laminations, means for maintaining the laminations and tubular members in assembled relation, each of the laminations comprising a plurality of circumferentially directed and yieldable tubular members arranged side by side and substantially in contact at all points, and means for maintaining the members of each lamination in assembled relation.

In testimony whereof I hereunto affix my signature in the presence of two witnesses.

JESSE G. SMITH.

Witnesses:
G. A. MIGURSKI,
ALICE MIGURSKI.

Copies of this patent may be obtained for five cents each, by addressing the "Commissioner of Patents, Washington, D. C."